(12) United States Patent
Liu

(10) Patent No.: US 12,280,478 B2
(45) Date of Patent: Apr. 22, 2025

(54) BROKEN PIPE EXTRACTION DEVICE

(71) Applicant: TRIPLE WIN TECHNOLOGY(SHENZHEN) CO. LTD., Shenzhen (CN)

(72) Inventor: Song-Hao Liu, Shenzhen (CN)

(73) Assignee: TRIPLE WIN TECHNOLOGY(SHENZHEN) CO. LTD., Shenzhen (CN)

( * ) Notice: Subject to any disclaimer, the term of this patent is extended or adjusted under 35 U.S.C. 154(b) by 409 days.

(21) Appl. No.: 17/702,953

(22) Filed: Mar. 24, 2022

(65) Prior Publication Data
US 2023/0001552 A1 Jan. 5, 2023

(30) Foreign Application Priority Data
Jul. 2, 2021 (CN) .......................... 202110750358.6

(51) Int. Cl.
*B25B 27/14* (2006.01)
*F16L 55/18* (2006.01)

(52) U.S. Cl.
CPC .............. *B25B 27/14* (2013.01); *F16L 55/18* (2013.01)

(58) Field of Classification Search
CPC ......... B25B 27/14; B25B 27/00; B25B 27/18; B25B 1/00; B25B 1/20; F16L 55/18
See application file for complete search history.

(56) References Cited

U.S. PATENT DOCUMENTS 6,557,229 B1 * 5/2003 Ricci ....................... B25B 27/14
269/49

FOREIGN PATENT DOCUMENTS

CN 207448659 U * 6/2018
CN 208442389 U * 1/2019

OTHER PUBLICATIONS

CN 207448659 Machine Translation (Year: 2018).*
CN 208442389 Machine Translation (Year: 2019).*

* cited by examiner

*Primary Examiner* — Eric J Rosen
*Assistant Examiner* — Robert C Moore
(74) *Attorney, Agent, or Firm* — ScienBiziP, P.C.

(57) ABSTRACT

A broken pipe extraction device includes first, second, and third pressure plates, a fixing member, a fastening member, and a needle. The first pressure plate includes a first perforation and a second perforation connected to the first perforation. The second perforation passes through a side wall of the first pressure plate. The second pressure plate faces the first pressure plate. Projecting portions of the first perforation and the second perforation on the second pressure plate overlap. The third pressure plate includes a through hole. The third pressure plate is detachably received in the first perforation and the second perforation. The fixing member mounts on the second pressure plate and faces the first perforation and the second perforation. When the third pressure plate is received in the first and second perforations, the through hole faces the fixing member.

15 Claims, 3 Drawing Sheets

BROKEN PIPE EXTRACTION DEVICE

FIELD

The subject matter herein generally relates to a broken pipe extraction device.

BACKGROUND

An air pipe joint, which is used to connect two different air pipes, is used in hydraulic and pneumatic systems. When the air pipe joint is separated from the air pipes, the air pipe may fracture, and a small section of broken pipe may remain in the air pipe joint. The broken pipe or piece in the air pipe joint is difficult to be taken out, resulting in a failure of the air pipe joint, or even of the whole system.

BRIEF DESCRIPTION OF THE DRAWINGS

Implementations of the present disclosure will now be described, by way of embodiments, with reference to the attached figures.

DETAILED DESCRIPTION

Figure 1:
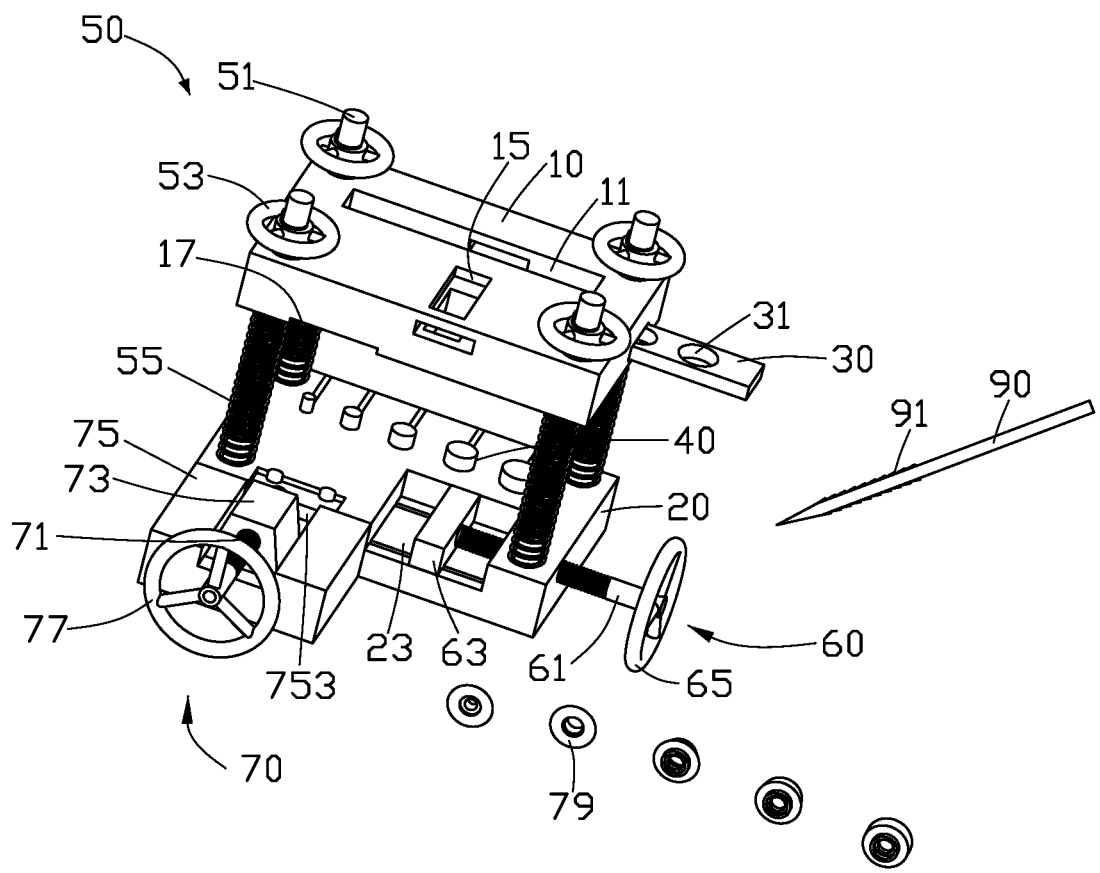
FIG. 1 is a diagrammatic view of an embodiment of a broken pipe extraction device according to the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts may be exaggerated to better illustrate details and features of the present disclosure.

The disclosure is illustrated by way of example and not by way of limitation in the figures of the accompanying drawings, in which like references indicate similar elements. It should be noted that references to "an" or "one" embodiment in this disclosure are not necessarily to the same embodiment, and such references mean "at least one."

The term "comprising," when utilized, means "including, but not necessarily limited to"; it specifically indicates open-ended inclusion or membership in the so-described combination, group, series, and the like.

Figure 2:
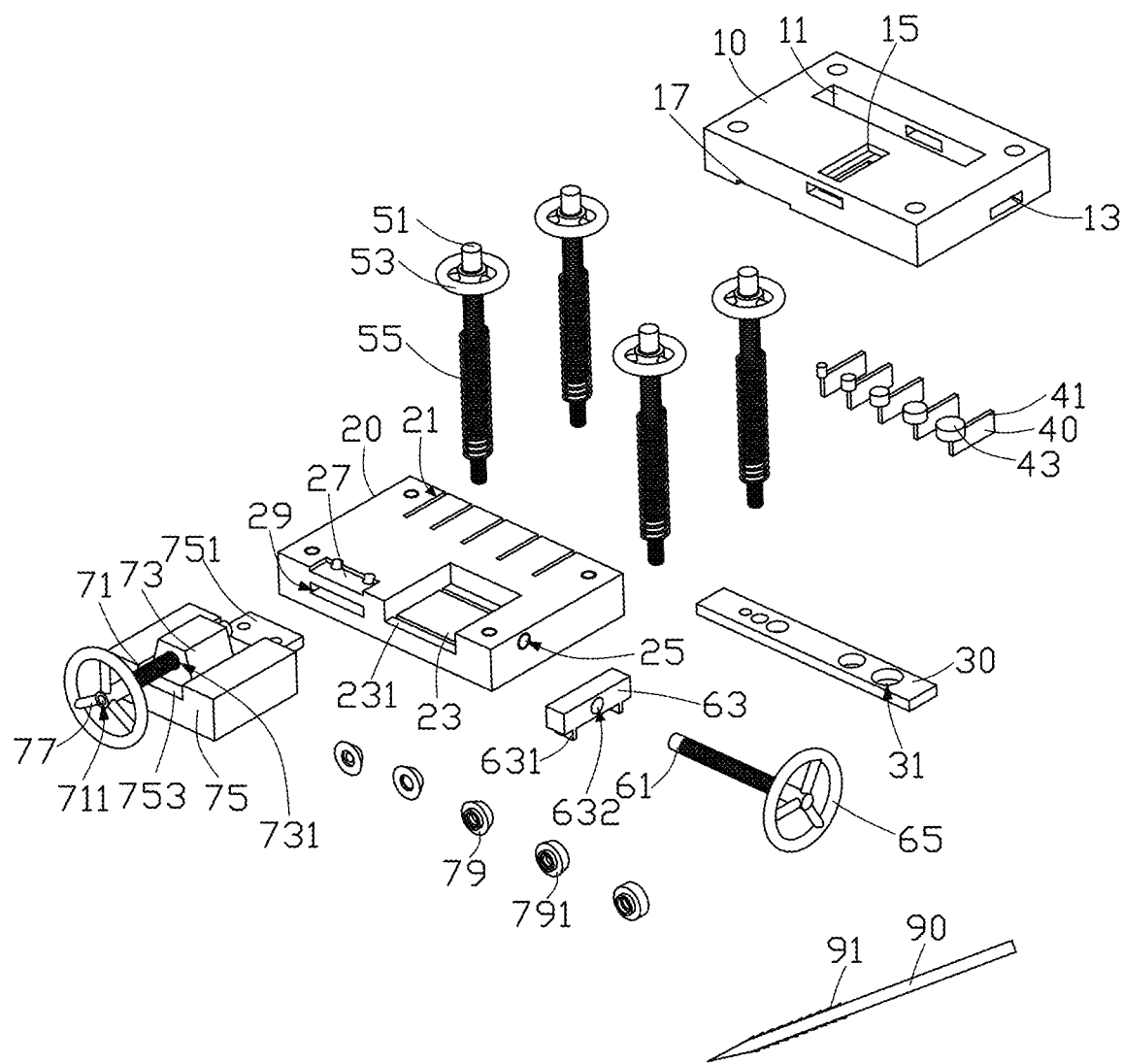
FIG. 2 is an exploded, diagrammatic view of the broken pipe extraction device of FIG. 1.

FIGS. 1 and 2 illustrate an embodiment of a broken pipe extraction device 100 used to take out a broken pipe or a piece of a broken pipe from an air pipe joint. The broken pipe extraction device 100 includes a first pressure plate 10, a second pressure plate 20, a third pressure plate 30, a fixing member 40, a fastening member 50, and a needle 90.

The first pressure plate 10 includes a first perforation 11 and a second perforation 13 connected to the first perforation 11. The second perforation 13 passes through a side wall of the first pressure plate 10. The second pressure plate 20 faces the first pressure plate 10. The projections of the first perforation 11 and the second perforation 13 on the second pressure plate 20 overlap with each other. The third pressure plate 30 includes a through hole 31. The third pressure plate 30 is detachably received in the first perforation 11 and the second perforation 13. The fixing member 40 is mounted on the second pressure plate 20 and faces the first perforation 11 and the second perforation 13. When the third pressure plate 30 is received in the first perforation 11 and the second perforation 13, the through hole 31 faces the fixing member 40. The fastening member 50 includes a slide rod 51 mounted on the second pressure plate 20. The first pressure plate 10 is movably sheathed on the slide rod 51. The needle 90 can be removed through the first perforation 11, the second perforation 13, and the through hole 31.

In at least one embodiment, the needle 90 includes a barb 91 for snagging the broken pipe.

Figure 3:
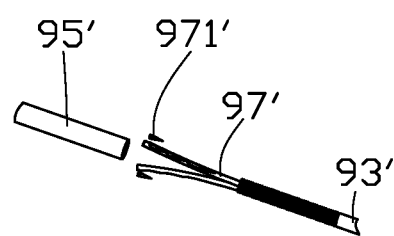
FIG. 3 is an exploded, diagrammatic view of another embodiment of a needle of a broken pipe extraction device.

Referring to FIG. 3, in another embodiment, the needle 90' includes a rod body 93', a sleeve body 95', and an elastic bar 97' partially received in the rod body 93'. The elastic bar 97' includes a barb 971'. The sleeve body 95' is movably sheathed on the rod body 93' to expose or hide the barb 971'. When the needle 90 enters a port receiving the broken pipe of the air pipe joint, the sleeve body 95' is rotated to expose the elastic bar 97'. The barb 971' on the elastic bar 97' can snag the broken pipe to take out the broken pipe or piece.

When taking out the broken pipe from the air pipe joint, the air pipe joint is placed on the fixing member 40, so that the port receiving the broken pipe of the air pipe joint faces the first perforation 11 and the second perforation 13. The first pressure plate 10 is moved to adjust the distance between the first pressure plate 10 and the second pressure plate 20. When the first pressure plate 10 approaches the air pipe joint, the first pressure plate 10 stops moving. The third pressure plate 30 is placed into the first perforation 11, so that the through hole 31 faces the fixing member 40 and the port receiving the broken pipe of the air pipe joint. The distance between the first pressure plate 10 and the second pressure plate 20 is adjusted again, so that the third pressure plate 30 abuts against the air pipe joint. The needle 90 passes through the first perforation 11, the second perforation 13, and the through hole 31, and then extends into the port receiving the broken pipe. Thereby, the broken pipe can be taken out.

Specifically, a straight threaded and irregular air pipe joint can be placed on the fixing member 40. Under the action of the first pressure plate 10, the second pressure plate 20, the third pressure plate 30 and the needle 90, the broken pipe in different types of air pipe joint can be taken out.

The second pressure plate 20 includes a first receiving groove 21 facing the first perforation 11. The fixing member 40 includes a fixing plate 41 received in the first receiving groove 21, and a fixing column 43 mounted on the fixing plate 41. The fixing column 43 can be received in the port of the air pipe joint to fix the air pipe joint.

In at least one embodiment, the first receiving groove 21 passes through a side wall of the second pressure plate 20, so that the fixing plate 41 is movably received in the first receiving groove 21.

In at least one embodiment, shape and size of the fixing column 43 match the shape and size of the port of the air pipe joint, so that the fixing column 43 can be received in the port of the air pipe joint.

In at least one embodiment, the fixed columns 43 are of different sizes, which allows broken pipe removal from the end of air pipe joints of different sizes.

The first pressure plate 10 further includes a third perforation 15 connected to the second perforation 13. The second pressure plate 20 further includes a second receiving groove 23 facing the third perforation 15. When the third pressure plate 30 is received in the third perforation 15, the through hole 31 faces the second receiving groove 23. A groove wall of the second receiving groove 23 includes a first opening 25 connected to the second receiving groove 23.

The broken pipe extraction device 100 further includes a first push member 60. The first push member 60 includes a first push rod 61 and a push block 63 movably received in the second receiving groove 23. The push block 63 includes a second opening 632. The first push rod 61 can move through the first opening 25 and the second opening 632.

In at least one embodiment, the third perforation 15 is mounted vertically in relation to the first perforation 11 and the second perforation 13.

In at least one embodiment, the third perforation 15 and the first perforation 11 are mounted at intervals.

In at least one embodiment, the first push member 60 further includes a first handle 65. The first handle 65 is connected to an end of the first push rod 61 away from the second receiving groove 23.

In at least one embodiment, the first push rod 61 includes an external thread on an outer surface of the first push rod 61. In at least one embodiment, the first opening 25 includes an internal thread on a hole wall of the first opening 25. Therefore, the first push rod 61 can be moved slowly through the first opening 25 and press the push block 63 to move.

In at least one embodiment, an inner diameter of the air pipe joint is in a range of 4 mm to 12 mm, an outer diameter of the air pipe joint is in a range of 12.4 mm to 21.18 mm.

When taking out a broken pipe or piece in the air pipe joint, the air pipe joint is placed in the second receiving groove 23, so that the port receiving the broken pipe from the air pipe joint faces the third perforation 15. The first push rod 61 is moved to drive the push block 63 in the direction approaching the port with the broken pipe, until the push block 63 abuts against the air pipe joint. The needle 90 passes through the third perforation 15 and then extends into the port with the broken pipe, so that the broken pipe can be removed.

Specifically, a straight threaded and irregular air pipe joint can be placed in the second receiving groove 23. Under the combined action of the second pressure plate 20, the first push member 60, and the needle 90, the broken pipe in the different types of air pipe joints can be removed.

A bottom or side wall of the second receiving groove 23 includes a sliding groove 231. The push block 63 includes a protrusion 631. The protrusion 631 is slidably received in the sliding groove 231 to move the push block 63 smoothly on the bottom wall of the second receiving groove 23.

The broken pipe extraction device 100 further includes a second push member 70. The second push member 70 includes a second push rod 71 and a support block 73 connected to the second push rod 71. The support block 73 includes a third opening 731. The second pressure plate 20 includes a first holding tank 27 close to one side of the second push member 70. The second push rod 71 moves through the third opening 731 to extend into the first holding tank 27. The second push rod 71 includes a fourth perforation 711 for the passage of the needle 90'.

In at least one embodiment, the second push member 70 further includes a second handle 77. The second handle 77 is connected to an end of the second push rod 71 away from the support block 73.

In at least one embodiment, the second push member 70 further includes a pressure head 79. The pressure head 79 includes a connecting joint 791 and a sixth perforation (not shown). The pressure head 79 can press on the air pipe joint. The sixth perforation passes through the connecting head 791. The connecting head 791 can be received in the fourth perforation 711, or an end of the second push rod 71 approaching the second pressure plate 20 can be received in the fourth perforation 711.

When taking out the broken pipe in the air pipe joint, the air pipe joint is placed in the first holding tank 27, so that the port receiving the broken pipe of the air pipe joint faces the second push rod 71 and is suspended in the first holding tank 27. The second push rod 71 is pushed to move in a direction approaching the first holding tank 27 in the third opening 731, until the second push rod 71 and the pressure head 79 abut against the port with the broken pipe of the air pipe joint. The needle 90' passes through the fourth perforation 711 and then enters the port with the broken pipe. The piece of broken pipe which is removed can be received in the pressure head 79. The broken pipe can be taken out after separating the pressure head 79 from the second push rod 71.

Specifically, air pipe joints which are straight or Y-shaped can be placed on the fixing member 40 or in the first holding tank 27. Under the action of the first pressure plate 10, the second pressure plate 20, the third pressure plate 30, and the needle 90 or 90', the broken pipe in the above different types of the air pipe joint can be taken out.

A side wall of the second pressure plate 20 approaching the second push member 70 includes a second holding tank 29 spaced apart from the first holding tank 27. The second push member 70 further includes a base 75 supporting the support block 73. A connecting plate 751 is convex on one side of the base 75 approaching the second pressure plate 20. The connecting plate 751 is received in the second holding tank 29 to connect the base 75 to a second pressure plate 20.

In at least one embodiment, the second holding tank 29 is mounted below the first holding tank 27.

In at least one embodiment, the support block 73 is mounted on the base 75.

The base 75 includes a third holding tank 753 connected to the first holding tank 27. The air pipe joint can be received in the first holding tank 27 and the third holding tank 753. The second push rod 71 can move through the third opening to extend into the third holding tank 753 and the first holding tank 27 to abuts against the air pipe joint.

In at least one embodiment, a step (not shown) is formed between a bottom wall of the third holding tank 753 and a bottom wall of the first holding tank 27 for placement of the air pipe joint.

In at least one embodiment, a surface of the first pressure plate 10 facing the second pressure plate 20 includes a receiving groove 17. The receiving groove 17 faces the first holding tank 27. When the first pressure plate 10 abuts against the air pipe joint, the receiving groove 17, the first holding tank 27, and the third holding tank 753 jointly form a space for holding the air pipe joint.

The fastening member 50 further includes a fastener 53 and an elastic member 55 sheathed on the slide rod 51. The first pressure plate 10 is movably sheathed on the slide rod 51 and is located between the fastener 53 and the elastic member 55.

In at least one embodiment, an outer surface of the slide rod 51 includes threaded portion. The fastener 53 is threaded with the slide rod 51.

When tightening the fastener 53, the fastener 53 drives the first pressure plate 10 to move in a direction approaching the second pressure plate 20 and squeezes the elastic member 55 at the same time. The elastic member 55 is compressed. When rotating the fastener 53 in the reverse direction, the fastener 53 moves in a direction away from the second pressure platen 20, and the elastic member 55 can rebound to move the first pressure plate 10 away from the second pressure platen 20.

It is to be understood, even though information and advantages of the present embodiments have been set forth in the foregoing description, together with details of the structures and functions of the present embodiments, the disclosure is illustrative only; changes may be made in detail, especially in matters of shape, size, and arrangement of parts within the principles of the present embodiments to the full extent indicated by the plain meaning of the terms in which the appended claims are expressed.

What is claimed is:

1. A broken pipe extraction device, comprising:
    a first pressure plate comprising a first perforation and a second perforation connected to the first perforation, the second perforation passing through a side wall of the first pressure plate;
    a second pressure plate facing the first pressure plate; wherein along a thickness direction of the first pressure plate, a projection of the first perforation and a projection of the second perforation overlap with each other;
    a third pressure plate comprising a through hole, the third pressure plate detachably received in the first perforation and the second perforation;
    a fixing member mounting on the second pressure plate and facing the first perforation and the second perforation, wherein when the third pressure plate is received in the first perforation and the second perforation, the through hole faces the fixing member;
    a fastening member comprising a slide rod mounted on the second pressure plate, the first pressure plate movably surrounding on the slide rod; and
    a needle detachably passing through the first perforation, the second perforation, and the through hole.

2. The broken pipe extraction device of claim 1, wherein the second pressure plate comprises a first receiving groove facing the first perforation, the fixing member comprises a fixing plate received in the first receiving groove, and a fixing column mounted on the fixing plate.

3. The broken pipe extraction device of claim 1, wherein the first pressure plate further comprises a third perforation connected to the second perforation, the second pressure plate further comprises a second receiving groove facing the third perforation, when the third pressure plate is received in the third perforation, the through hole faces the second receiving groove.

4. The broken pipe extraction device of claim 3, wherein a groove wall of the second receiving groove comprises a first opening connected to the second receiving groove, the broken pipe extraction device further comprises a first push member, the first push member comprises a first push rod and a push block movably received in the second receiving groove, the push block comprises a second opening, the first push rod moves through the first opening and the second opening.

5. The broken pipe extraction device of claim 4, wherein a bottom or side wall of the second receiving groove comprises a sliding groove, the push block comprises a protrusion, the protrusion is slidably received in the sliding groove.

6. The broken pipe extraction device of claim 4, wherein the first push member further comprises a first handle, the first handle is connected to an end of the first push rod away from the second receiving groove.

7. The broken pipe extraction device of claim 3, wherein the third perforation is connected to the first perforation and perpendicular to the first perforation, and the third perforation is connected to the second perforation and perpendicular to the second perforation.

8. The broken pipe extraction device of claim 4, further comprising a second push member, wherein the second push member comprises a second push rod and a support block connected to the second push rod, the support block comprises a third opening, the second pressure plate comprises a first holding tank closed to a side of the second push member, the second push rod is configured to pass through the third opening and extend into the first holding tank, the second push rod comprises a fourth perforation allowing the needle to pass through.

9. The broken pipe extraction device of claim 8, wherein a side wall of the second pressure plate adjacent to the second push member comprises a second holding tank spaced apart from the first holding tank, the second push member further comprises a base supporting the support block, a connecting plate is convex on a side of the base adjacent to the second pressure plate, the connecting plate is received in the second holding tank.

10. The broken pipe extraction device of claim 9, wherein the base comprises a third holding tank connected to the first holding tank, the second push rod is configured to pass through the third opening and further extend into the third holding tank and the first holding tank.

11. The broken pipe extraction device of claim 8, wherein the second push member further comprises a second handle, the second handle is connected to an end of the second push rod away from the support block.

12. The broken pipe extraction device of claim 1, wherein the fastening member further comprises a fastener and an elastic member surrounding the slide rod, the first pressure plate is movably sheathed on the slide rod and is located between the fastener and the elastic member.

13. The broken pipe extraction device of claim 12, wherein an outer surface of the slide rod comprises threads, the fastener is connected to with the slide rod through the threads.

14. The broken pipe extraction device of claim 1, wherein the needle comprises a barb.

15. The broken pipe extraction device of claim 1, wherein the needle comprises a rod body, a sleeve body, and an elastic bar partially received in the rod body, the elastic bar comprises a barb, the sleeve body is movably sheathed on the rod body to expose or hide the barb.

* * * * *